United States Patent [19]
Larson

[11] 4,117,889
[45] Oct. 3, 1978

[54] APPARATUS FOR GUIDING ROW CROP PROCESSING IMPLEMENTS

[76] Inventor: John C. Larson, Clements, Minn. 56224

[21] Appl. No.: 761,373

[22] Filed: Jan. 21, 1977

[51] Int. Cl.$^2$ ............................................. A01B 69/00
[52] U.S. Cl. ..................................... 172/26; 172/450; 172/681; 104/244.1; 111/33; 172/1; 172/126; 172/134; 172/191; 172/265
[58] Field of Search .................. 172/387–393, 172/195, 1, 23, 26, 681, 705, 713, 126–132, 694, 695, 719, 721, 748, 762, 765, 768, 770, 134, 190, 752, 733, 265, 278, 191; 104/244.1; 111/33, 86

[56] References Cited

U.S. PATENT DOCUMENTS

| | | | |
|---|---|---|---|
| 274,962 | 4/1883 | Nutting | 172/265 |
| 988,284 | 3/1911 | Perkins | 172/765 X |
| 1,053,341 | 2/1913 | Adriance | 172/705 X |
| 2,228,172 | 1/1941 | Luttichau | 172/278 |
| 2,730,030 | 1/1956 | Chambers | 172/190 X |
| 3,128,833 | 4/1964 | Johnson et al. | 172/176 X |
| 3,402,773 | 9/1968 | Jennings et al. | 172/265 |
| 3,437,061 | 4/1969 | Wells | 172/190 X |
| 3,998,275 | 12/1976 | Eisenhardt | 172/26 |

FOREIGN PATENT DOCUMENTS 1,200,791  8/1970  United Kingdom ..................... 172/770

Primary Examiner—Paul E. Shapiro
Attorney, Agent, or Firm—Burd, Braddock & Bartz

[57] ABSTRACT

A row crop planter supports at least two vertical guide making blocks to form superficial trenches about four or five inches deep precisely midway between adjacent rows as they are planted. Tires with trench-riding central ridges on front wheels of a tractor powering a subsequent row crop processing implement along these rows serve to guide the tractor down the rows. Vertical guide following blocks on such a subsequent processing implement such as a cultivator, for example, find and follow exactly the previously formed trenches and so serve to guide cultivator blades to follow every minor deviation of the rows, even on hillsides causing the implement to be tilted transversely of the direction of movement of the implement down the rows. The depth of the guide trenches and the depth of penetration of the guide following blocks is determined by implement support wheels near those blocks. The guide blocks are spring mounted on vertical guide blocks support bars to pivot rearwardly to clear rocks or other obstructions and to swing back into position when such obstruction has been passed over. When one guide following block is momentarily not guided by its trench, the remaining guide block will guide the entire implement.

4 Claims, 9 Drawing Figures

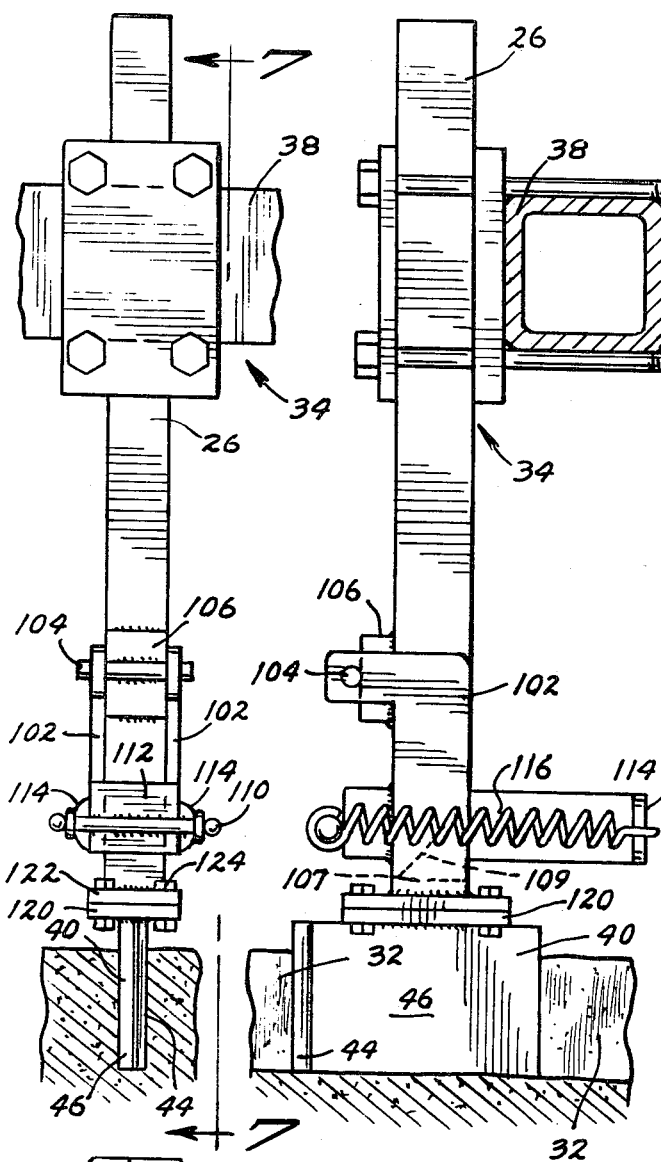

APPARATUS FOR GUIDING ROW CROP PROCESSING IMPLEMENTS

BACKGROUND OF THE INVENTION

This invention relates to row crop processing implements and to apparatus for guiding them to pass down the field in precise parallel relationship with respect to the plant rows which are being processed. The apparatus involves means for establishing guide paths in the earth at the time the position and direction of the crop rows is being established; and means for subsequently guiding the processing implements along the rows, utilizing the guide paths previously formed.

This broad general idea is old. See U.S. Pat. No. 3,840,076, granted in October of 1974 to Capehart. In that patent, a forwardly hooked shaped cutter blade 20 is pulled through the earth on a seed planter to establish a guide path or slit while the planter is establishing the positioning of the rows. A lecticular disc 28, mounted on a subsequently used processing implement is employed to try to follow the guide path or slit 26. The disc rotates on a horizontal axis perpendicular to the direction of travel of the implement, and the lenticular disc and the row crop processing implement are so related that the disc supports a substantial portion of the weight of the implement "to thereby bodily and directly move" the "implement laterally in response to changes in direction of" the "slit." The structure of the Capehart patent is, however, subject to substantial operating difficulties.

First, the forwardly hooking cutter blade 20 has to extend "downwardly a very substantial distance into soil 24, preferably to a depth of the order of 8 to 10 inches . . . " In conditions where the moisture in the soil and near the surface of the soil is critical, as it always is in the planting and growing of crops, a slit of this depth will allow substantial quantities of rain and/or irrigation moisture to rapidly drain below the area where it will be of maximum help to establish and support the growth of the row crops in question.

Furthermore, the establishment of a guide path or slit 26 as shown in Capehart simply by pulling a blade 20 through the soil, even where that path is supposedly reinforced and compacted by a further lenticular disc 28 proceeding directly in its wake, does not produce the kind of shallow straight-sided trench which has been found useful and necessary in the subsquent guiding of row processing implements along row crops. Any trash or roots or other obstructions encountered by such a cutter blade will tend to pivot right around the blade and come to rest just behind it. This is similar to the action obtained by pulling one's vertically held finger through soft sand on a beach, for example. The subsequent action of the closely following lenticular disc is simply to attempt to compact a V-shape guide path or "slit" behind where the cutter blade 20 has disturbed the soil.

In contrast, the apparatus of the present invention presents a guide plate or block having a wedge-shaped leading edge and a flat plate-like trailing portion of some substantial length behind the wedge. Upon drawing such an implement or guide making block through the soil, any trash or debris or any roots or rocks will tend to be pushed to the side by the wedge and will tend to move around behind the wedge. However, this they cannot do since they immediately encounter the flat plate-like trailing portion of the guide block which slides past them and the surrounding earth, tightly packing vertical side walls of a guide path or trench to bind those obstructions together with the earth in the trench side walls. By the time the guide block has past, then, substantial vertical trench side walls are justified and established.

Subsequent wheels or rollers acting along the top of the trench established by the apparatus of the present invention do no more than firm up or compact the top edges of the vertical side walls of the trench; and trench cleaning spikes or teeth trailed down the guide paths or trenches subsequently do no more than dislodge any debris which has fallen into the trench to force it to one side or the other of that guide path.

In attempting to follow the guide path or slit 26 with a lenticular disc 28 as demonstrated in the Capehart patent, severe difficulties are encountered. In wet or damp soil conditions, the rolling lenticular disc necessarily picks up great quantities of mud, and carries that mud around to the point where the disc tends to be lifted out of the guide path and to lose its direction relative to that path or slit. Because the lenticular disc is a sharpened disc, as soon as it begins to lose direction with respect to the guide path or slit, whether it is carrying mud in wet conditions or not, it will grab or cut into the solid earth and will cause a severe drag in the direction in which it has deviated from the guide path, thus wrenching the vehicle out of its proper track, thus acting to destroy the row crops as the implement blades are carried into the rows.

This is exactly and precisely opposite to the action of a flat, substantially elongated guide plate being drawn through a previously established guide path such as a trench with vertical side walls. Using such a guide block, the continuous sliding action of that block as it is pulled through wet or damp soil, for example, causes the block to be continuously wiped clean and and causes no tendency to build up which will interfere with the action of the guide block in guiding the row processing implement.

Furthermore, should the guide block for any reason start to move out of its trench, or should the guide block be started down the row before it is actually aligned with the trench, the lack of lateral support of the earth on the side of the guide block toward the trench, as this earth is forced into the trench, for example, and the firm support of the earth on the side of the guide block away from the trench immediately causes the guide block to move toward the trench thus centering the implement precisely with respect to the crop rows.

The tendency of structures such as disclosed in the Capehart patent to cut into the side of the guide path and to climb out of the path is particularly pronounced when such structure is attempted to be used to cultivate row crops which lie on a field or hillside in which the tractor and cultivating implement are tilted in direction transverse to the direction of the rows. In this situation it is necessary to steer the towing tractor up just as close as possible to the uphill side of the rows in an effort, often a vain effort, to prevent the processing implement from damaging the downhill side of adjacent rows.

Other structures which have utilized guide paths to attempt to guide processing implements, but which have not utilized the structure of the present invention include:

U.S. Pat. No. 1,241,173 to Von Meyenburg in September of 1917;

U.S. Pat. No. 1,608,666 granted to Plum in November of 1926;

U.S. Pat. No. 1,723,073 granted to Poll in August of 1929;

U.S. Pat. No. 2,948,543 granted to Collier in August of 1960; and

U.S. Pat. No. 3,127,689 granted to Hopkins in April of 1964;

The present inventor initially experimented with structures such as shown in the patent to Collier, but found that the "boat hull" effect of the guide means caused too much friction, excessive wear, and not precise guidance. The structure was abandoned in favor of the structure of the invention as set out in claims herein.

Other patents which were cited in a search of the prior art, and which are believed to be at least somewhat pertinent include:

U.S. Pat. No. 7961 granted to Pierce in September of 1866;

U.S. Pat. No. 264,434 granted to Benson in September of 1882;

U.S. Pat. No. 291,975 granted to Benson in January of 1884;

U.S. Pat. No. 502,712 granted to Freeman in August of 1893; and

U.S. Pat. No. 1,113,492 granted to Schlicht in Oct. of 1914.

Applicant is aware of no other prior art which would affect the patentability of his invention.

SUMMARY OF INVENTION

A row crop implement is powered through a field to establish the position of crop rows, and verticall plate-like guide blocks are pulled through the field by that implement to form superficial vertical walled guide trenches in precise parallel relationship to such crop rows.

Subsequently, row crop processing implements are powered through the field with vertical plate-like guide following blocks moving in these previously established guide trenches to exactly position the crop processing implement with respect to the crop rows.

These guide trenches can also serve as guide tracks for ridged tractor wheels on tractors moving along the rows to draw such row crop processing implements or otherwise.

IN THE DRAWINGS

FIG. 1 is a top plan view of a pull type row crop planter attached to the drawbar of a tractor and with guide block supporrt bars and guide making blocks supported on the planter;

FIG. 5 is a fragmentary side elevational view of the apparatus of FIG. 3 disclosing part of the apparatus as seen in FIG. 4 but including also portions of the cultivator omitted in FIG. 4;

FIG. 6 is an enlarged vertical fragmentary view taken on the line 6—6 in FIG. 4 with parts broken away;

FIG. 7 is a vertical sectional view taken on the line 7—7 in FIG. 6 with parts in section and parts omitted;

FIG. 8 is also a vertical sectional view taken on the line 7—7 in FIG. 6 but showing the operation of the mounting between a vertical guide block and a guide block support bar when the guide block encounters an obstruction; and FIG. 9 is an enlarged fragmentary view taken on the line 9—9 in FIG. 5.

DESCRIPTION OF PREFERRED EMBODIMENT

Figure 2:
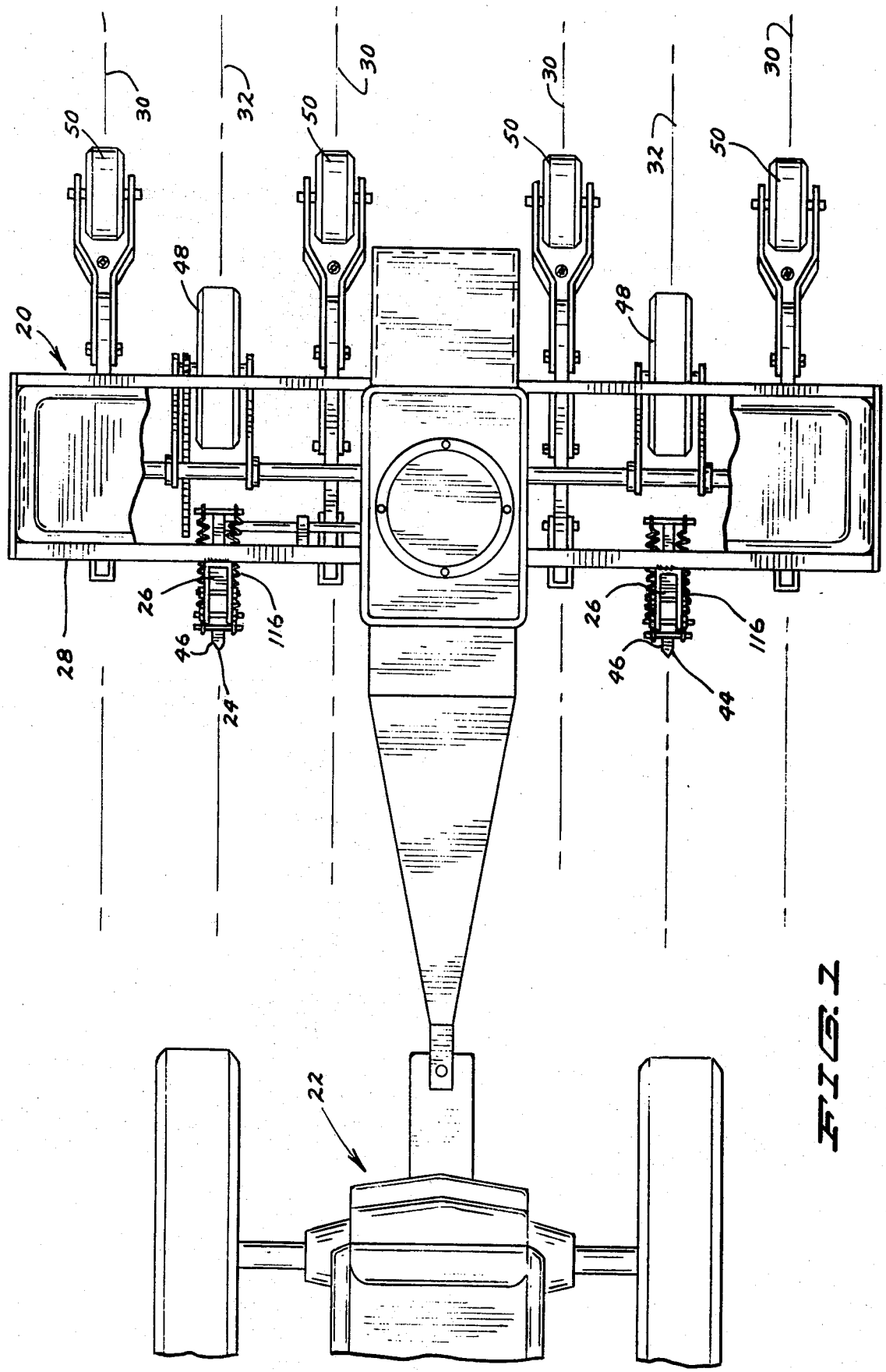
FIG. 2 is a side elevational view of the apparatus of FIG. 1.
Figure 2:
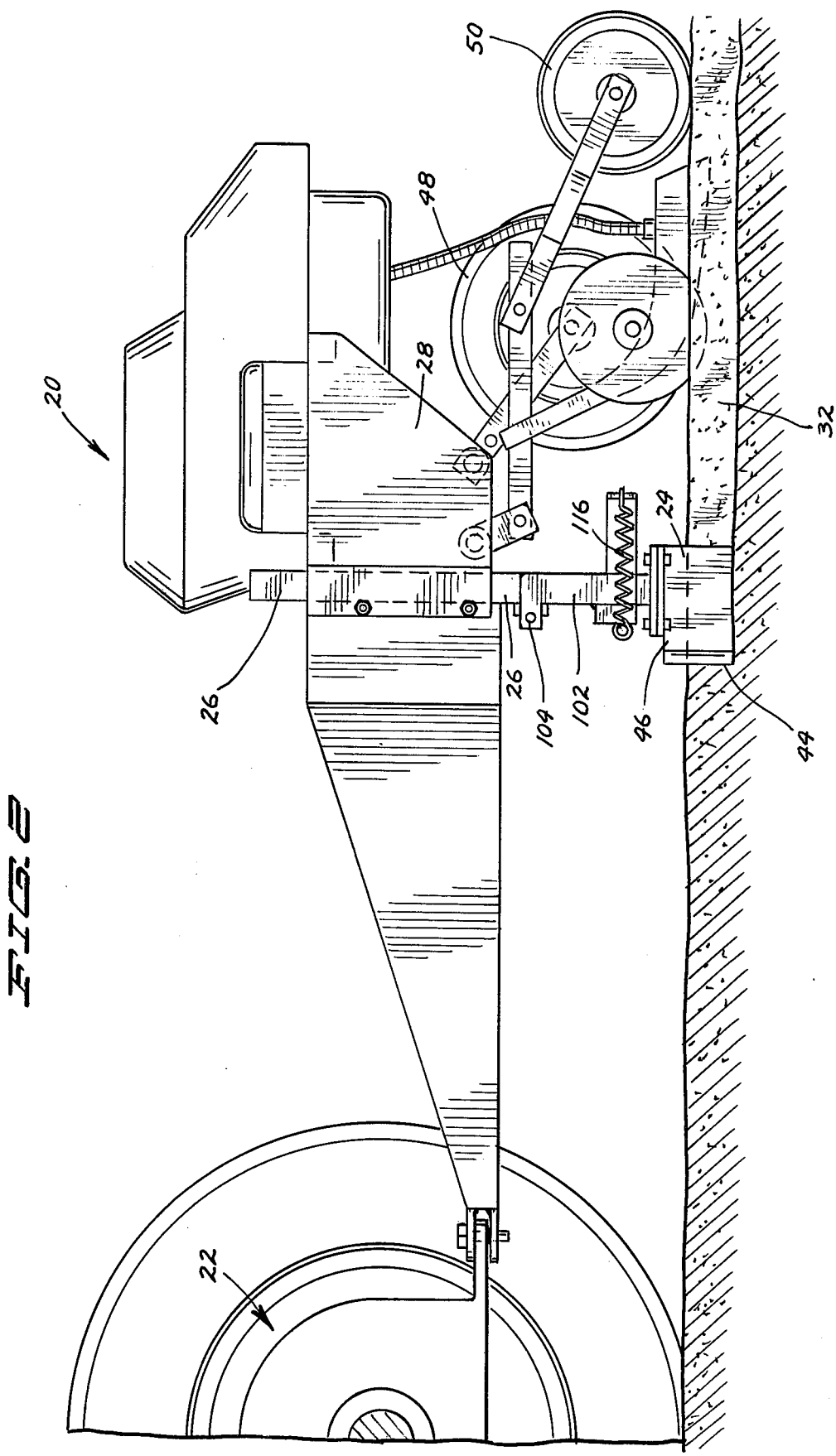

A seed planter for row crops, as shown a pull type planter 20, is powered by a tractor 22 as seen in FIGS. 1 and 2. Vertical guide making blocks 24,24 are each firmly mounted to a vertical guide block support bar 26. These support bars 26 are each fixedly positioned to a leading edge of a frame 28 of the planter 20 in position to support the guide making blocks 24,24 to penetrate the earth about 4 to 5 inches (10-13 cm) deep, each precisely midway between adjacent rows of seeds 30 being planted by the planter. As the tractor, planter and blocks move forward, the guide blocks form trenches 32,32 about 4 to 5 inches (10-13 cm) deep in the earth.

Figure 3:
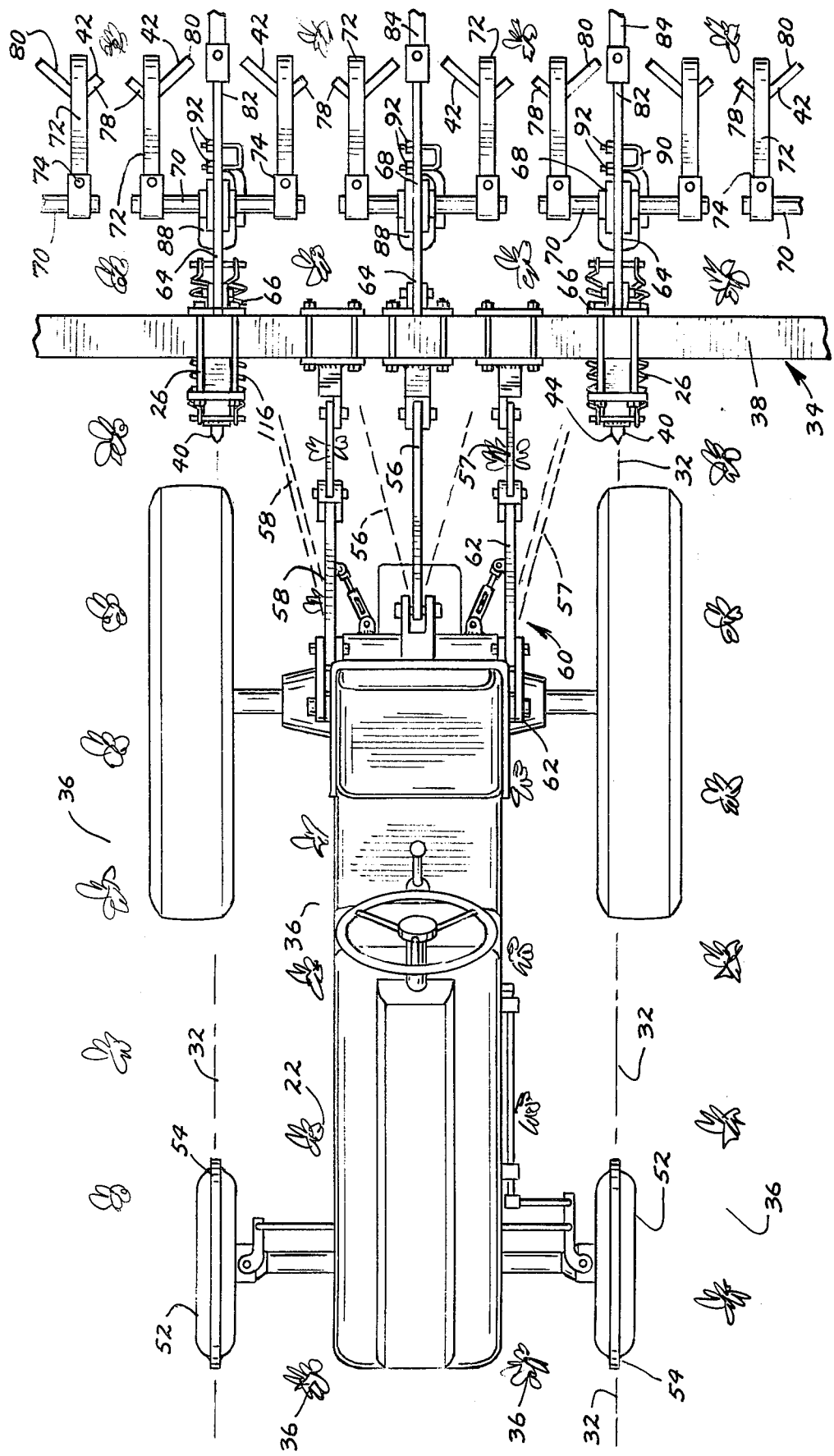
FIG. 3 is a top plan view of a tractor and a pull type row crop cultivator in operative position with respect to row crops being cultivated and with vertical guide block support bars and vertical guide following blocks mounted on the spreader bar of the cultivator.
Figure 4:
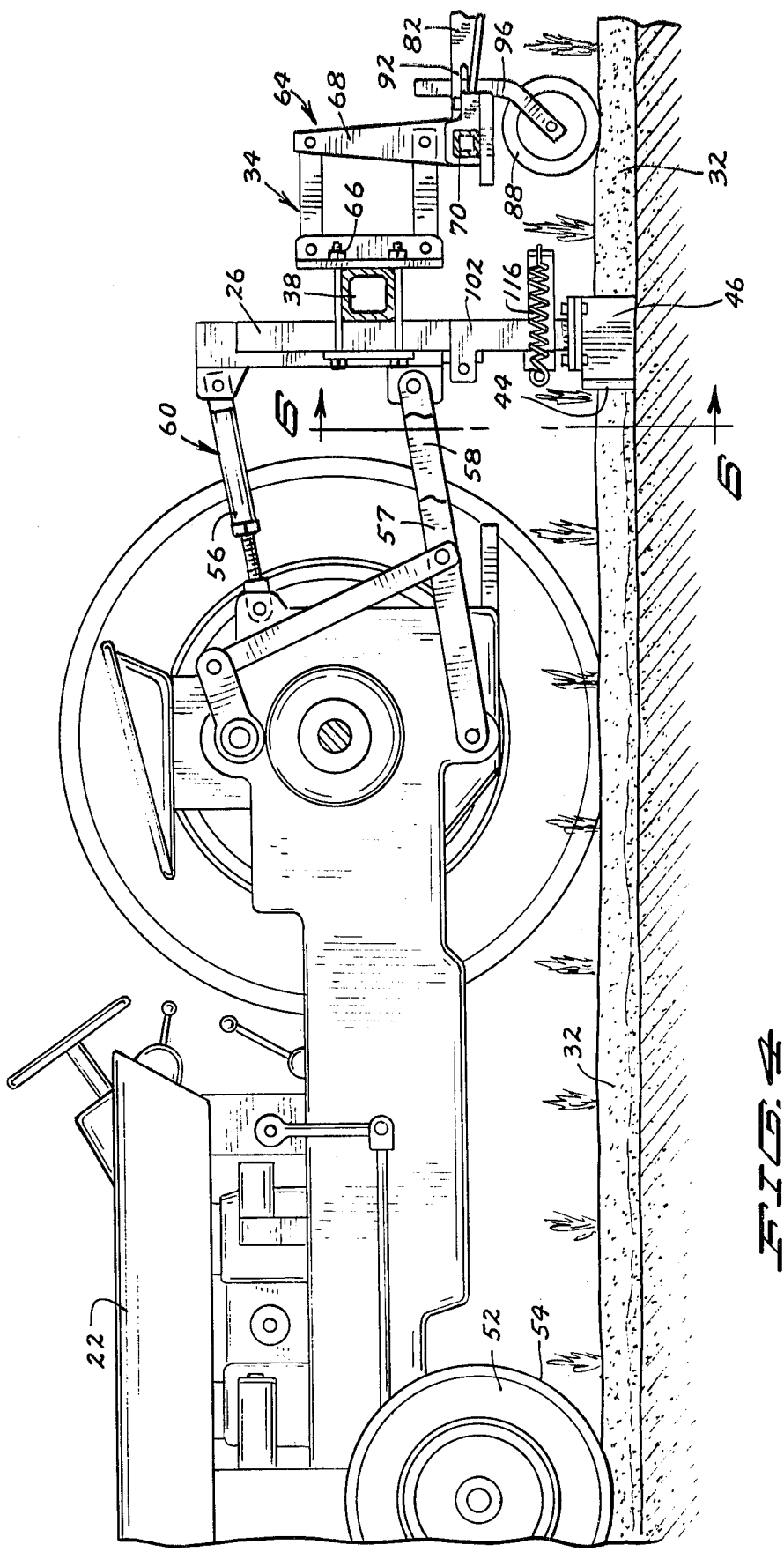
FIG. 4 is an enlarged fragmentary side elevational view of the apparatus of FIG. 3.

As seen in FIGS. 3, 4, and 5, a tractor 22 draws a pull type row crop processing implement, as shown a cultivator 34, along crop rows 36 which have been formed upon germination and growth of the seeds in seed rows 30. As shown, the cultivator 34 includes a spreader bar 38 along its leading edge. Vertical guide block support bars 26, which can be, but need not be, identical with block support bars 26 on the row crop seed planter 20, are fixedly supported on the spreader bar 38. Vertical guide following blocks 40,40 are each firmly mounted to a bottom end portion of one of the support bars to extend about 4 to 5 inches, (10-13cm) more or less, into the ground and to follow along a trench 32 originally made during planting by a guide making block 24 to guide the cultivator so that cultivator half sweeps 42 will be held in precise predetermined relation to the crop rows. Vertical guide following blocks 40 can be, but need not be, identical with vertical guide making blocks 24.

Hereinafter the guide making blocks will be treated as identical to the guide following blocks and both will sometimes be referred to as guide blocks 40. The guide block support bars 26 and the means for firmly mounting the guide blocks to these support bars will be considered identical whether attached to the planter 20 or the cultivator 34.

Each of the guide blocks 40 (including guide making blocks 24) has a wedge-shaped leading edge 44 and a flat plate-like trailing portion 46.

The frame 28 of the row crop seed planter 20 is maintained at an approximate predetermined distance above the ground by appropriate carrying wheels and/or gauge wheels 50 so that the seed planting function of the planter will be performed properly. Since the vertical guide block support bars 26 are fixedly mounted to this frame and since the guide making blocks 24,24 are firmly mounted at bottom ends of these support bars, the vertical relationship of the guide blocks 24,24 with respect to the surface of the ground is likewise maintained. The apparatus will be so adjusted that this penetration of the guide block into the ground will amount to usually not over about 5 inches (13 cm).

As the tractor 22 draws the seed planter 20 over the surface of the area to be seeded, the guide making blocks 24,24 (guide blocks 40,40) are forced through the earth and the earth is separated by the wedge-shaped leading edges 44 and packed or compacted by the flat plate-like trailing portions 46 to form in the earth trenches 32,32. In the form of the invention as shown, a planter carrying wheel 48 rolls over the top of a trench 32, but this is not necessary. In fact, the planter does not even have to be of the pull type but could be a tool bar planter mounted, for example, in front of the tractor. In either case, the tractor operator will do his best to guide the tractor smoothly and evenly straight down the field so that the seed rows 30 formed by the planter are as straight as possible.

In the form of the invention as shown, planter gauge wheels 50 roll over the top of the seed rows 30 right after the seeds are planted to form those rows.

Typically, after the seeds have been in the ground for a week or so, it is usually desirable to cultivate a field of soybeans by moving cultivator sweeps down between the rows to disturb and uproot any and all plant life other than the soybeans in the rows. These sweeps should be brought as close to the soybean plants in the crop rows 36 as is possible without danger of disturbing or injuring or uprooting plants in the rows. In order to do this, the vertical guide following blocks 40,40 move down the trenches 32,32 formed during the planting operation to hold the deviation of movement of the paths of the cultivator sweeps to, typically, less than 1 inch (2.5 cm) from precise parallel relationship with respect to the path of that portion of the planter which established the rows of seeds 30.

The timing for first cultivation of rows of corn and of rows of sugar beets is approximately three weeks, depending on growing conditions. It is usually advisable to continue cultivation at three week intervals thereafter.

Since the exact and precise guiding of the pull type row crop processing implement is done by the guide blocks 40,40 running in trenches 32,32, it is necessary only that the tractor 22 be kept on an approximate parallel path with respect to the crop rows 36 as it pulls the processing implement. This is accomplished by utilizing front tractor tires 52,52 which have central radially outwardly extending ridges 54 thereon. As shown, these tires 52 are spaced apart by a distance exactly equal to twice the center line distance between the original rows of seeds 30. For example, if the rows are 30 inches (76 cm) apart, the center lines of the ridges 54 of the front tractor tires 52,52 will be 60 inches (152 cm) apart.

Before the processing implement, for example, the cultivator 34 is lowered into the contact with the ground, the tractor 22 will be aligned so that the tire ridges 54 are situated in upper portions of the trenches 32 as seen in FIGS. 4 and 3. Even during extended dry spells where severe winds blowing across the rows have been encountered, and even after extensive rains, it has been found that once the ridges of the front tractor tires are aligned in the trenches 32,32, the tractor will consistently proceed down along the rows in parallel relation thereto without the necessity for the tractor operator to touch the steering wheel of the tractor. Because both tractor wheels are being steered, an accidental short length fill-up or breakdown of either one of the trenches will not cause the tractor to depart from its course as long as the other trench is in steering relationship to the ridge 54 of the tractor tire 52.

While a cultivator 34 is illustrated and described in connection with the apparatus of the invention, many other kinds of pull type row crop processing implements can be similarly guided. For example, in order to thin sugar beet rows with the use of hand-held hoes, a cultivator such as the cultivator 34 will be operated along the rows in a manner to be more exactly described, to come within 3 to 4 inches (7-10 cm) of the center line of the row and to leave only that much of the row left standing. A person using a hand held hoe will move along the rows and will chop out the beet plants to be thinned, causing them to fall into the cultivated space between the rows. Next a shovel cultivator, guided by the apparatus of the invention, will pass down the space between the rows and will throw the earth back on the remaining beets in the rows. Other processing instruments such as choppers, harvesters, or the like will be similarly guided with respect to the rows.

In the form of the invention as shown, the cultivator 34 includes a spreader bar 38 which is fastened by arms 56, 57 and 58 of a three point tractor hitch 60 to the tractor 22. The hitch can be of any usual or preferred construction, forming no part of the invention. The spreader bar 38, and hence the entire cultivator 34 can be lifted from the ground by the three point hitch 60 through the instrumentality of means 62 on the tractor.

The three pont hitch 60, typically, is mounted for limited horizontal pivotal movement of the arms 56, 57 and 58 as indicated in dotted lines in FIG. 3 thus to allow lateral movement of the cultivator 34 with respect to the tractor 22 for as much as 1 foot (37 cm) in each direction. This action allows the vertical guide following blocks 40,40 to precisely guide the cultivator 34 and consequently the cultivator half sweeps 42 to move in an exactly and precisely parallel path with respect to the original rows of seeds 30 and consequently the resulting crop rows 36.

It is to be noted that the cultivator half sweeps 42 are approximately the same distance behind the vertical guide following blocks 40 as the seed depositing mechanisms on the planter 20 are behind the vertical guide making blocks 24,24. Thus any deviations from straightness of the seed rows 30,30 due to roughness of the field during the planting or due even to inattentiveness of the tractor operator during planting will be exactly and precisely duplicated by the cultivator half sweeps 42 because the guide following blocks 40,40 are positioned in the same part of the trench when the half sweeps are doing their work as were the guide making blocks 24,24 when the seeds were being deposited. The cultivator 34, in addition to the spreader bar 38 attached to the tractor hitch 60, includes a plurality of cultivator parallel linkages 64 each attached to the spreader bar 38 as at 66. A vertical rear link 68 of each of the linkages 64 supports at a bottom end thereof, a horizontal front tool bar 70 extending transversely of the direction of movement of the cultivator. At outer ends of each front tool bar 70 are fastened row cultivator shanks 72,72 as at 74. A cultivator half sweep 42 is fastened at the lower end of each row cultivator shank 72 to have a trim side 78 of the sweep located adjacent the row 36 to be cultivated and a full side 80 on the side of the shank away from the row being cultivated.

A horizontal rear tool bar 82 extends longitudinally of the direction of the movement of the cultivator and is fixedly mounted at its forward end with respect to the bottom of the rear link 68 of each parallel linkage 64 and with respect to the front tool bar 70. A rear cultivator shank 84 is connected to can rear of the tool bar 82, and a full cultivator sweep 86 is connected to the outer lower end of the shank 84.

As the cultivator is moved down the rows, the trim sides 78 of the half sweeps 42 move in close adjacent relationship to the plants in the crop rows 36. Because of the apparatus of the invention, the clearance between the plants in the crop rows 36 and the adjacent trim sides of the half sweeps 42 ca be accurately maintained at whatever distance is considered optimum for processing a particular crop in a particular phase of its development. The full sides 80 of the half sweeps 42 combine with the full sweeps 86 to work or perturb all of the earth between the trim side of the half sweeps 42 adjacent one crop row 36 to the trim side 78 of the other half sweep of the next adjacent row. Thus all weeds and other plant life are uprooted or otherwise destroyed.

The depth to which the sweeps 42 and 86 extend into the ground is controlled by a cultivator gauge wheel 88 for each parallel linkage 64. Each gauge wheel is rotatably mounted to a standard 90 which is adjustably mounted with respect to a lower end of vertical rear link 68, as at 92, adjacent the forward end of rear tool bar 82. The gauge wheel 88 is designed to roll over the ground and to support the sweeps 42 and 86 to have a nominal penetration into the ground of 2 inches (5 cm) more or less.

The construction of the parallel linkages 64 is such that the ostensibly horizontal bars of the linkage cannot move upwardly past horizontal due to an upward thrust of the ground on the gauge wheel 88; but can move downwardly below the horizontal when, for example, one of the gauge wheels drops into a depression while the other wheel(s) is riding at a higher level.

As best seen in FIGS. 5 and 9, in addition to full cultivator sweep 86 on each rear cultivator shank 84 which is in alignment with one of the trenches 32, a trench cleaning spike or tooth 94 is fastened as at 96 to the bottom of rear cultivator shank 84 in position to clear and clean out the trench 32 so that the trench will be ready to guide the next set of tractor tires 52,52 and/or the next set of guide blocks 40,40 of the next processing implement to move along the rows.

OPERATION DURING PROCESSING OF ESTABLISHED CROP ROWS

With means 62 elevating tractor hitch 60 to hold the pull type row crop processing implement such as cultivator 34 clear of the ground, the tractor 22 is aligned with the beginning of the rows which are to be cultivated by bringing its front wheels 52 over the trenches 32 which were formed earlier so that the tire ridges 54 extend into the upper part of the trenches. The tractor operator will start the tractor down the rows, holding the front wheels in this position by the use of the steering wheel until the tractor aligns with the rows as seen in FIG. 3. At this point, the operator will cause the arms 56, 57 and 58 of the tractor hitch to be lowered.

The hitch will be lowered to lower the spreader bar until the cultivator gauge wheels 88 are in contact with the ground. If the vertical guide following blocks 40,40 are in exact alignment with trenches 32,32, each will be lowered into a trench to take position as seen in FIGS. 4, 5, 6 and 7. However, if not, as soon as the tractor operator causes the tractor and the implement to begin forward motion, the guide blocks will dig in to have a penetration on the order of 4 or 5 inches (10–13 cm). Because of the necessary and desirable side play in the rearward outer ends of the hitch arms 60, the guide plates 40 could be as much as almost an entire foot (30 cm) away from the center of trenches 32,32. As the tractor moves forward, there is a natural tendency for the implement and the guide plates to center on the tractor; but there is an even greater tendency for the guide plates to move toward their trenches, particularly when they are within 6 inches (15 cm) of them. For example, such centering movement of the guide plates into the center of the trench when the tractor begins to move forward is accomplished before the implement has moved ahead 1 or 2 yards (1 or 2 meters). It is believed that this rapid centering action takes place due to the lack of balanced forces on the guide plate. The lack of lateral support of the earth on the side toward the trench and the firm lateral support in drag of the earth on the side of the guide plate away from the trench is believed to cause this rapid movement toward the trench.

Once the guide plates are in alignment with the trenches, this alignment is accurately and positively maintained throughout the entire length of the rows being processed, whether or not the movement of the tractor in lateral direction tends to pull the implement out of its true course.

This effect is particularly noticeable where the row processing implement is operating on a field which causes the tractor and the implement to be tilted out of the horizontal in direction transverse to the movement of the tractor. In the use of row crop processing implements before the present invention, and in the use of such implements employing other so-called guiding means, it was and is necessary to drive the tractor as close as possible to the uphill rows in order to try to prevent the implement from taking position that would cause it to damage or destroy the downhill rows. Probably because of the heavy pressure on the downhill side of the guide following block and the lack of pressure on the uphill side of the block, and/or because of the presence of the wedge-shaped leading edge 44 of the block, it has been found that the guide blocks are effective in holding the implements in the desired alignment and relationship to the rows being processed even under sever transverse hillside conditions. severe The means for firmly holding each guide block 40 to its vertical guide block support bars 26 includes a pair of guide block pivot plates 102,102, pivotally mounted as at 104 to a first support bar boss 106 extending forwardly from support bar 26. The bottom end of the support bar 26 terminates in an angular end surface 107, situated at an angle of 45° with respect to its longitudinal axis as shown. Guide block pivot plates 102, 102 are each integral with a guide block stop and spacer plate 108 which terminates in an angular end surface 109. These end surfaces 107 and 109 are positioned in contacting relationship with each other when guide block 40 is firmly held in its operative position directly below vertical guide block support bar 26.

A tension spring support pin 110 extends transversely of the direction of processing implement movement from a second support bar boss 112 which extends integrally forwardly of the support bar. A pair of tension spring support ears 114,114 extend outwardly from the guide block pivot plates 102,102 and the spacer plate 108 in direction transverse to the movement of the implement. Tension coil springs 116,116 each extend between one end of the spring support pin 110 and one of the spring support ears 114.

OPERATION OF GUIDE BLOCK MOUNTING

When the row forming implement is initially forming a trench, or when a row crop processing implement is being guided by the trench, the position of the guide block with respect to the earth and the trench is as seen in FIGS. 1 through 7. When an obstruction such as a rock 118 lies in the path of a guide block 40, part of the action which takes place is illustrated in FIG. 8. The guide block pivot plates 102,102, the guide block stop and spacer plate 108, and the guide block 40 will all pivot around pivot point 104 against the action of tension coil springs 116,116 sufficiently to allow the wedge-shaped leading edge 44 of the guide plate to pass over the top of the rock. As soon as the rock is passed, the springs 116 will cause the pivot plates and guide block to pivot back into position as seen in FIG. 7, for example.

Where this action takes place as the trench 32 is just being established, and where the obstruction is not too large, the tractor operator can go back and dislodge the obstruction so that the subsequent guideplates, on row crop processing implements, will not encounter it. Where, however, the obstruction is too large to be dislodged, the guide plates encountering it during the row crop processing stage will simply pivot up, and be carried over the obstruction, and will then come back into position in exactly the same manner as did the guide plate when the trench was originally formed.

During the time the guide plate is pivoting over an obstruction, it is able to perform less of a guiding function for the implement. At this time, the other guide plate(s) will be in normal operational relationship to the earth and will hold the implement steady on its course.

Row crop seed planters, other row forming implements, and cultivators, harvesters and other row crop processing implements come in various sizes and can handle from two rows to 12 rows or even more at one time. In each case, sufficient guide plates and guide plate support blocks will be provided to insure that sufficient trenches are formed and sufficient guiding action is provided for effective operation. For example, for processing up to six or eight rows, two trenches and two guide plates will be provided and for processing up to 12 rows, four trenches and four guide plates will be used.

Of the apparatus of the invention, the only part subject to wear is the guide block 40. As best seen in FIGS. 6 through 8, the guide block can easily be replaced when it is worn or damaged. It is provided with an integral top guide block plate 120. The guide block pivot plates 102,102 are both integral with a single guide block attachment plate 122. To replace the guide block 40, fastening means 124 such as nuts and bolts are removed, a new guide block and guide block plate put into place, and the fastening means replaced.

During the development and testing of the apparatus of the present invention, large number of rows of crops were successfully processed with no operator present in the tractor. These tests were both on flat fields and fields constituted as at least partially transverse hillsides. This testing was done to insure that an operator would not instinctively grab the steering wheel to overcome a momentary tendency on the part of the tractor to depart from a straight line, whether that momentary tendency was caused by an obstacle in the path of the tractor or of the guide plates or was caused by a deviation from a straight path by the operator who originally piloted the tractor as it formed the rows and established the trenches.

This testing also demonstrated conclusively that a tractor operator utilizing the present invention has only to sit in position on the tractor and does not have to arduously steer the tractor along the rows to try to keep the tractor hitch so positioned that the row processing implement will be properly aligned with those rows and will not cause damage by coming too close to one side of the row while failing to effectively cultivate on the other side of the row.

The embodiments of the invention in which an exclusive property or privilege is claimed are defined as follows:

1. In combination with an implement for moving over the ground to establish the location of crop rows in a field, apparatus for establishing a guide trench in precise parallel relation to such crop rows, said apparatus including:
    A. a plurality of vertical guide block support bars fixedly positioned with respect to said implement in spaced relation to each other in direction transverse to the moving direction of the implement;
    B. a plurality of vertical guide making blocks each firmly mounted with respect to a lower end of one of said support bars to have position beneath the surface of the ground on which the implement is supported and to lie in a vertical plane in parallel relation to the direction of travel of said implement as it moves over the field;
    C. each such block including a relatively short wedge-shaped leading edge portion and an elongated flat plate-like trailing portion; and
    D. wherein said means for firmly mounting each guide block with respect to a lower end of one of said support bars includes:
        (1) a guide block pivot plate pivotally mounted with respect to a lower end portion of said support bar;
        (2) means for attaching said guide block to said guide block pivot plate including a guide block attachment plate integral with a lower end of said pivot plate, a guide block plate integral with an upper edge of said guide block and removable fastening means to connect said guide block plate and said guide block attachment plate;
        (3) resilient means for urging said pivot plate and said guide block to move forwardly in the direction of motion of said implement; and
        (4) stop means fixed with respect to said support bar and said pivot plate for limiting the forward motion of said guide block to position whereby said wedge-shaped leading edge portion of said block is in substantially perpendicular relationship with respect to the ground on which the implement is supported.

2. In combination with laterally movable implements for moving over the ground to establish the location of crop rows in a field and for processing crops in those rows, apparatus for establishing a guide trench in precise parallel relation to such crop rows and for guiding said row crop processing implements using said trenches, said apparatus including:
    A. a plurality of vertical guide block support bars fixedly positioned with respect to each of said implements in spaced relation to each other in direction transverse to the moving direction of the implement to which they are fixedly positioned;
B. a plurality of vertical guide blocks, each firmly mounted with respect to a lower end of one of said support bars to have position beneath the surface of the ground on which the implement to which it is mounted is supported and to lie in a vertical plane in parallel relation to the direction of travel of that implement as it moves over the field;
C. each such block including a relatively short wedge-shaped leading edge portion and an elongated flat plate-like trailing portion; and
D. wherein said means for firmly mounting each guide block with respect to a lower end of one of said support bars includes:
  (1) a guide block pivot plate pivotally mounted with respect to a lower end portion of said support bar;
  (2) means for attaching said guide block to said guide block pivot plate, said means including a guide block attachment plate integral with a lower end of said pivot plate, a guide block plate integral with an upper edge of said guide block and removable fastening means to connect said guide block plate and said guide block attachment plate;
  (3) resilient means for urging said pivot plate and said guide block to move forwardly in the direction of motion of said implement; and
  (4) stop means fixed with respect to said support bar and said pivot plate for limiting the forward motion of said guide block to position whereby said wedge-shaped leading edge portion of said block is in substantially perpendicular relationship with respect to the ground on which the implement is supported.

3. The combination as specified in claim 2:
E. a plurality of cultivator blades mounted on said implement to have position to cultivate the ground directly over and in alignment with each of said guide trenches established by at least some of said vertical guide making blocks; and
F. a trench cleaning tooth fixedly mounted on said implement behind each of said cultivator blades, each of said trench cleaning teeth extending downwardly from said cultivator blade in alignment with its guide trench and extending beneath the surface of the ground not deeper than the depth of its aligned guide block, said tooth having transverse dimension beneath the surface of the ground not greater than the transverse dimension of said guide block.

4. In combination with a laterally movable implement for moving over the ground to process parallel spaced apart crop rows in a field in which a plurality of parallel spaced apart guide trenches are provided in parallel spaced relation to said crop rows, apparatus for guiding said implement utilizing said guide trenches, said apparatus including:
A. a plurality of vertical guide block support bars fixedly positioned with respect to said implement in spaced relation to each other in direction transverse to the moving direction of the implement;
B. a plurality of vertical guide following blocks, each firmly mounted with respect to a lower end of one of said support bars to have position beneath the surface of the ground on which the implement is supported and to lie in a vertical plane in parallel relation to the direction of travel of said implement as it moves over the field;
C. each such block including a relatively short wedge-shaped leading edge portion and an elongated flat plate-like trailing portion; and
D. wherein said means for firmly mounting each guide block with respect to a lower end of one of said support bars includes:
  (1) a guide block pivot plate pivotally mounted with respect to a lower end portion of said support bar;
  (2) means for attaching said guide block to said guide block pivot plate, said means including a guide block attachment plate integral with a lower end of said pivot plate, a guide block plate integral with an upper edge of said guide block and removable fastening means to connect said guide block plate to said guide block attachment plate;
  (3) resilient means for urging said pivot plate and said guide block to move forwardly in the direction of motion of said implement; and
  (4) stop means fixed with respect to said support bar and said pivot plate for limiting the forward motion of said guide block to position whereby said wedge-shaped leading edge portion of said block is in substantially perpendicular relationship with respect to the ground on which the implement is supported.

* * * * *

UNITED STATES PATENT AND TRADEMARK OFFICE
CERTIFICATE OF CORRECTION

PATENT NO. : 4,117,889
DATED : October 3, 1978
INVENTOR(S) : John C. Larson

It is certified that error appears in the above-identified patent and that said Letters Patent are hereby corrected as shown below:

Column 3, line 36, "verticall" should be --vertical--.

Column 3, line 54, "supporrt" should be --support--.

Column 6, line 30, "pont" should be --point--.

Column 7, line 4, "can" should be --the--.

Column 7, line 12, "ca" should be --can--.

Column 8, line 47, after "conditions.", omit "severe".

Signed and Sealed this

Thirtieth Day of January 1979

[SEAL]

Attest:

RUTH C. MASON
Attesting Officer

DONALD W. BANNER
Commissioner of Patents and Trademarks